(12) United States Patent
Shinagawa

(10) Patent No.: US 12,397,827 B2
(45) Date of Patent: Aug. 26, 2025

(54) ASSISTANCE APPARATUS, VEHICLE, COMPUTER READABLE STORAGE MEDIUM, AND ASSISTANCE METHOD

(71) Applicant: HONDA MOTOR CO., LTD., Tokyo (JP)

(72) Inventor: Masaharu Shinagawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 232 days.

(21) Appl. No.: 18/160,283

(22) Filed: Jan. 26, 2023

(65) Prior Publication Data

US 2023/0322262 A1 Oct. 12, 2023

(30) Foreign Application Priority Data

Mar. 28, 2022 (JP) ................................ 2022-052491

(51) Int. Cl.
*B60W 60/00* (2020.01)
*B60W 40/02* (2006.01)
*B60W 40/10* (2012.01)

(52) U.S. Cl.
CPC ........ *B60W 60/0016* (2020.02); *B60W 40/02* (2013.01); *B60W 40/10* (2013.01);
(Continued)

(58) Field of Classification Search
CPC .. B60W 60/0016; B60W 40/02; B60W 40/10; B60W 60/0059; B60W 2554/60;
(Continued)

(56) References Cited

U.S. PATENT DOCUMENTS 6,281,786 B1 * 8/2001 Adachi ................. G01S 13/862
367/909
6,327,522 B1 * 12/2001 Kojima .................. B60K 35/29
701/1
(Continued)

FOREIGN PATENT DOCUMENTS

JP 2003256985 A 9/2003
JP 2008070999 A * 3/2008
(Continued)

OTHER PUBLICATIONS

Office Action issued for counterpart Japanese Application No. 2022-052491, transmitted from the Japanese Patent Office on Jul. 29, 2025 (drafted on Jul. 23, 2025).

*Primary Examiner* — Mary Cheung

(57) ABSTRACT

An assistance apparatus includes a reception unit configured to receive information indicating a travelling hazardous point which is transmitted from an outside of a vehicle, a calculation unit configured to calculate a distance and an orientation from the vehicle to the point based on the point and a current position of the vehicle, a detection unit configured to detect the point inside a detection range set within a range in which a distance from the vehicle is a first distance or more and a second distance or less, and an assistance control unit configured to perform travelling assistance when the point is detected inside the detection range, in which the first distance is a travel distance required for a speed of the vehicle to be slowed down to a predetermined speed or less by the time the vehicle reaches the point from the current position of the vehicle.

21 Claims, 7 Drawing Sheets

(52) U.S. Cl.
CPC ..... *B60W 60/0059* (2020.02); *B60W 2554/60* (2020.02); *B60W 2554/80* (2020.02)

(58) Field of Classification Search
CPC ......... B60W 2554/80; B60W 30/0953; B60W 30/095; B60W 2050/143; B60W 2520/10; B60W 2520/125; B60W 2520/14; B60W 2552/00; B60W 2552/40; B60W 2556/40; B60W 2556/50; B60W 2556/65; B60W 40/06; B60W 50/14; G01S 2013/9316; G01S 2013/932; G08G 1/096708; G06V 20/56

See application file for complete search history.

(56) References Cited

U.S. PATENT DOCUMENTS

| | | | | |
|---|---|---|---|---|
| 2015/0063648 A1* | 3/2015 | Minemura | ............... | G06F 18/21 |
| | | | | 382/104 |
| 2015/0307091 A1* | 10/2015 | Gokan | .................... | G01S 7/539 |
| | | | | 701/70 |
| 2023/0120095 A1* | 4/2023 | Horihata | .............. | G08G 1/0141 |
| | | | | 701/301 |

FOREIGN PATENT DOCUMENTS

| | | | | | |
|---|---|---|---|---|---|
| JP | 2009014560 A | * | 1/2009 | ........... | G01S 15/931 |
| JP | 2010079487 A | | 4/2010 | | |
| JP | 2011253241 A | | 12/2011 | | |
| JP | 2015045622 A | | 3/2015 | | |

\* cited by examiner

| SPEED [km/s] | MAXIMUM DISTANCE L1 [m] | SPREAD ANGLE [°] ||
| --- | --- | --- | --- |
| | | STRAIGHT ROAD | CURVED ROAD |
| 20 | D20 | θ20 | θ20' (>θ20) |
| 30 | D30 (>D20) | θ30 (<θ20) | θ30' (>θ30 AND ALSO <θ20') |
| ⋮ | ⋮ | ⋮ | ⋮ |

FIG.6

ASSISTANCE APPARATUS, VEHICLE, COMPUTER READABLE STORAGE MEDIUM, AND ASSISTANCE METHOD

The contents of the following Japanese patent application(s) are incorporated herein by reference:
NO. 2022-052491 filed on Mar. 28, 2022.

BACKGROUND

1. Technical Field

The present invention relates to an assistance apparatus, a vehicle, a computer readable storage medium, and an assistance method.

2. Related Art

In recent years, efforts have been intensified to provide an access to a sustainable transportation system with consideration also given to vulnerable people among traffic participants. To this end, research and development has been focused on to further improve traffic safety and convenience through research and development regarding a preventive safety technology. Patent Documents 1 and 2 describe a technique related to a range for detecting an object or another vehicle.

LIST OF CITED REFERENCES

Patent Document 1: Japanese Patent Application Publication No. 2015-45622
Patent Document 2: Japanese Patent Application Publication No. 2011-253241

BRIEF DESCRIPTION OF THE DRAWINGS

FIG. 6 illustrates a data structure of detection range data which is referred to when a range change unit 220 sets a detection range.

DESCRIPTION OF EXEMPLARY EMBODIMENTS

Hereinafter, the present invention will be described by way of embodiments of the invention, but the following embodiments are not intended to limit the invention according to the claims. In addition, not all of the combinations of features described in the embodiments are essential for a solving means of the invention.

Figure 1:
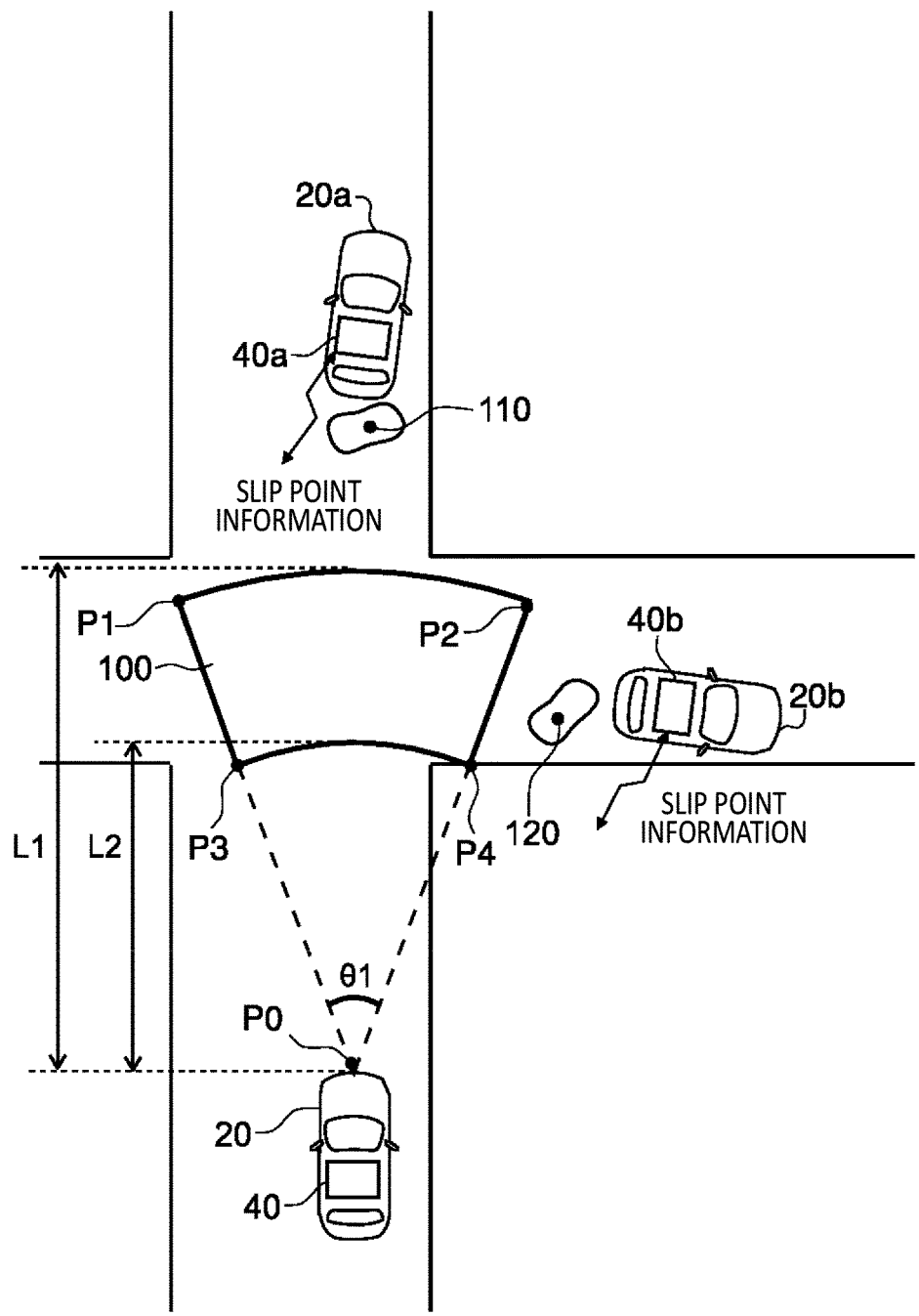
FIG. 1 schematically illustrates a usage scene of an assistance apparatus 40 according to an embodiment.

FIG. 1 schematically illustrates a usage scene of an assistance apparatus 40 according to an embodiment. The vehicle 20 includes an assistance apparatus 40. The vehicle 20a includes an assistance apparatus 40a. The vehicle 20b includes an assistance apparatus 40b. The assistance apparatus 40, the assistance apparatus 40a, and an assistance apparatus 40b have a communication function, and are configured to provide vehicle-to-vehicle communication of the vehicle 20, the vehicle 20a, and the vehicle 20b. The assistance apparatus 40, the assistance apparatus 40a, and the assistance apparatus 40b have a travelling assistance function of performing control related to travelling assistance of the respective vehicles.

The vehicle 20a is a vehicle travelling ahead on a travelling path of the vehicle 20. The vehicle 20b is a vehicle travelling on a path different from the travelling path of the vehicle 20. The assistance apparatus 40, the assistance apparatus 40a, and the assistance apparatus 40b can inform another vehicle of slip points which are points at which the respective vehicles have slipped.

In FIG. 1, when it is sensed that the vehicle 20a has slipped because of a puddle or the like during travelling, the assistance apparatus 40a transmits, to surrounding vehicles, slip point information indicating a slip point 110 that is a point at which the vehicle 20a has slipped. When it is sensed that the vehicle 20b has slipped because of a puddle or the like during travelling, the assistance apparatus 40b transmits, to surrounding vehicles, slip point information indicating a slip point 120 that is a point at which the vehicle 20b has slipped. The slip point information may include latitude and longitude information of the slip point.

It is assumed that the vehicle 20 is travelling on a straight road. When the slip point information is received, the assistance apparatus 40 sets a detection range 100 for detecting the slip point. The detection range 100 is a range located ahead of the vehicle 20 along the direction of travel of the vehicle 20 relative to a current position P0 of the vehicle 20. Specifically, the detection range 100 is a range obtained by excluding a fan-shaped range with a central angle θ1 which is surrounded by a straight line P0P3, an arc with a radius L2, and a straight line P0P4 from a fan-shaped range with the central angle θ1 which is surrounded by a straight line P0P1, an arc with a radius L1, and a straight line P0P2. Herein, P3 is on the straight line P0P1, and P4 is on the straight line P0P2. The detection range 100 is a range bilaterally symmetrical with respect to the direction of travel of the vehicle 20.

When the vehicle 20 has slowed at a predetermined deceleration rate, L2 is a distance for the vehicle 20 to travel until the speed of the vehicle 20 is slowed down to a predetermined speed. In this manner, L2 is set according to the vehicle speed of the vehicle 20. Similarly as in L2, L1 is set according to the vehicle speed of the vehicle 20. L1 is set to be longer than L2.

When the slip point 110 is inside the detection range 100, the assistance apparatus 40 performs the travelling assistance. On the other hand, when the slip point 110 is not inside the detection range 100, the assistance apparatus 40 does not perform the travelling assistance. As illustrated in FIG. 1, since the slip point 110 and the slip point 120 do not exist inside the detection range 100, the assistance apparatus 40 does not perform the travelling assistance.

Note that in a case where the travelling assistance is performed, even when new slip point information is received from another vehicle, a configuration may be adopted where the assistance apparatus 40 continues the travelling assistance until the vehicle 20 passes through the slip point 110 and does not perform travelling assistance based on information indicating a new travelling hazardous point.

Note that when the slip point is sensed, the assistance apparatus 40 may transmit slip point information indicating the slip point that is sensed to the outside of the vehicle 20.

When the slip point is sensed, a configuration may be adopted where the assistance apparatus 40 does not perform the travelling assistance.

Figure 2:
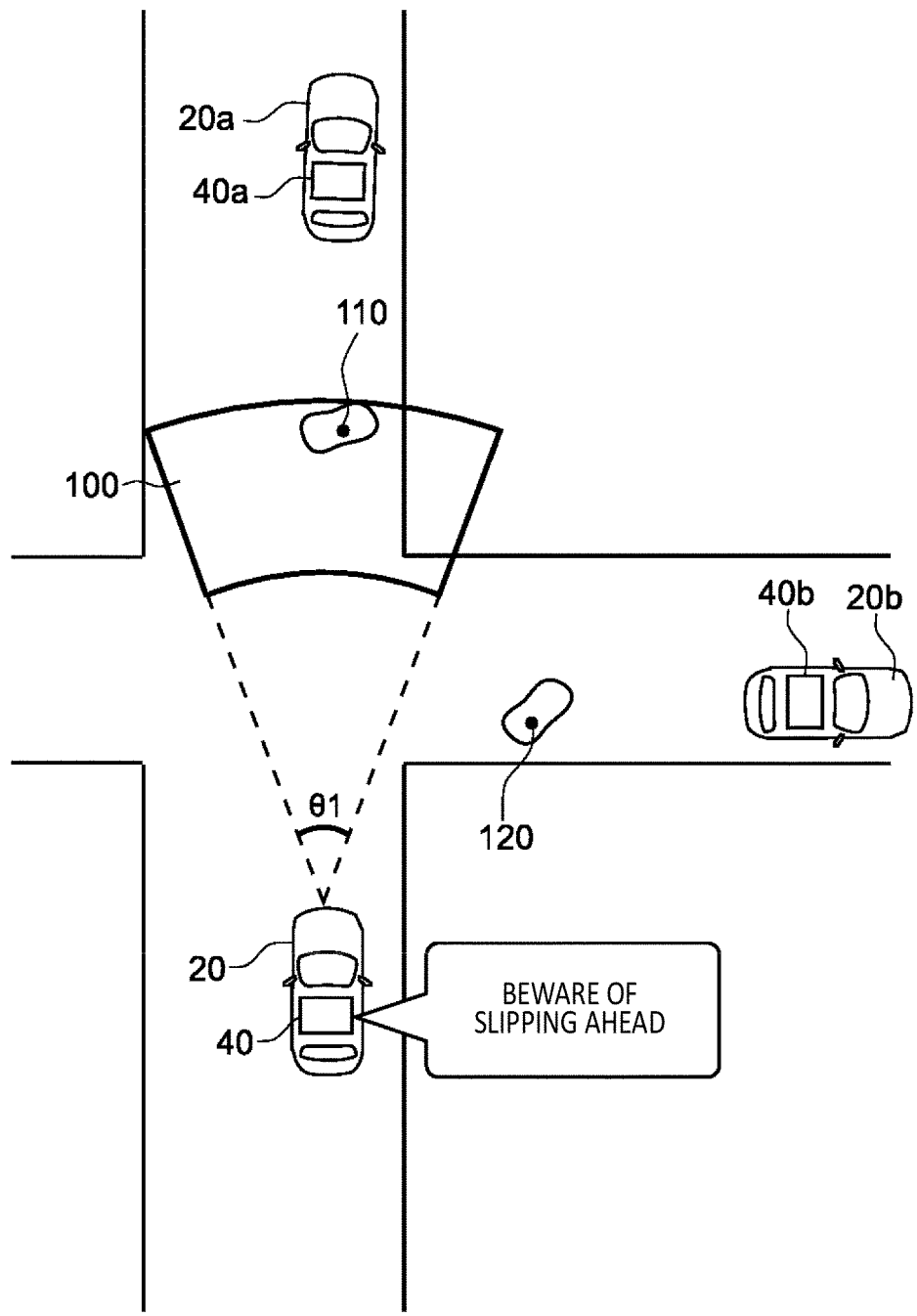
FIG. 2 illustrates a state in which a vehicle 20 travels in a direction of travel.

FIG. 2 illustrates a state in which the vehicle 20 travels in the direction of travel. As the vehicle 20 further travels, when the slip point 110 enters the detection range 100, the assistance apparatus 40 performs the travelling assistance. For example, the assistance apparatus 40 outputs an alert to a driver of the vehicle 20 to beware of slipping.

As a result, it is possible to perform notification when the vehicle speed of the vehicle 20 can be slowed down to the predetermined speed by the time the vehicle 20 reaches the slip point 110. Furthermore, it is possible to suppress output of an unnecessary alert related to the slip point 120.

Figure 3:
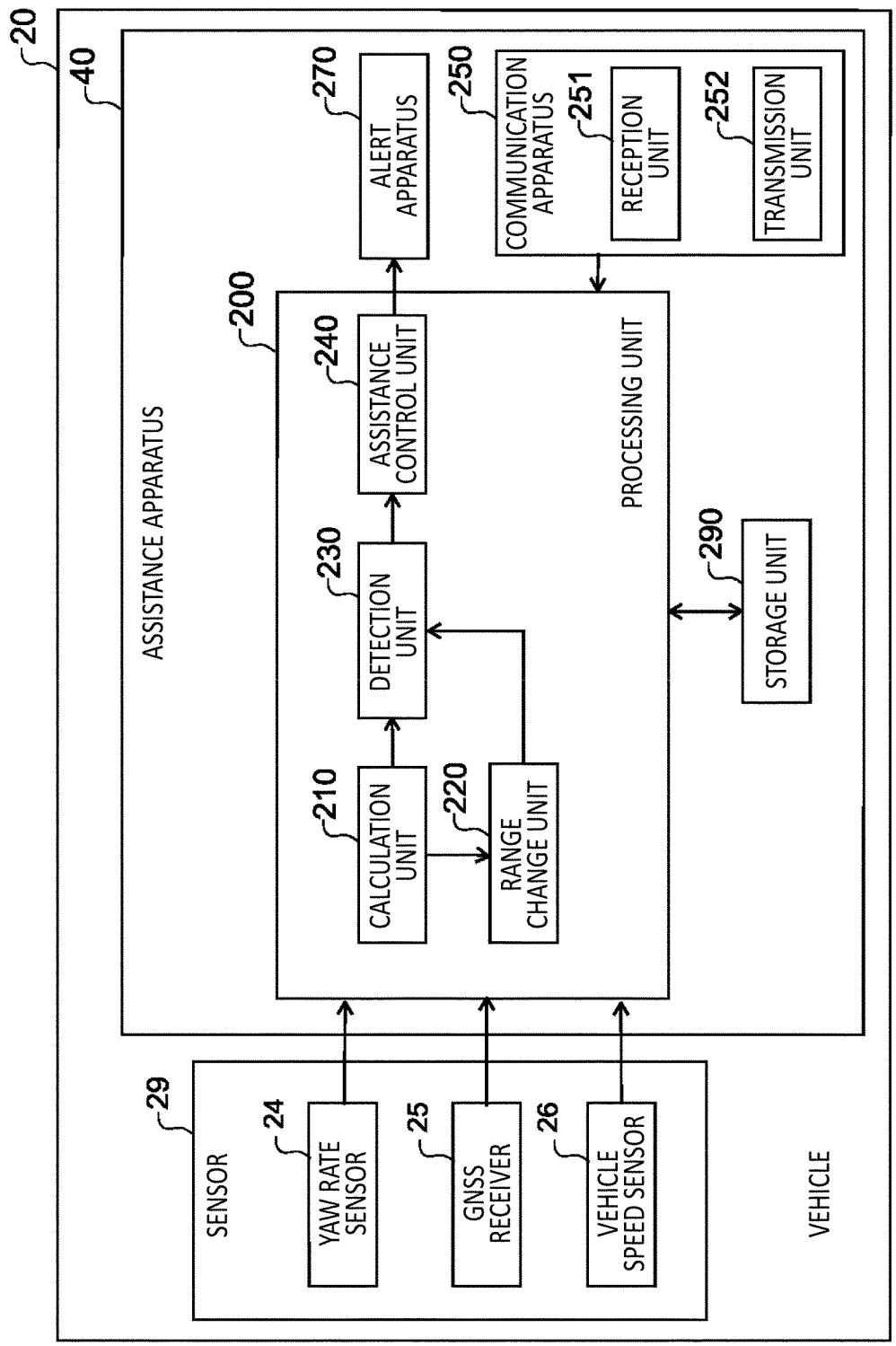
FIG. 3 illustrates a system configuration of the vehicle 20.

FIG. 3 illustrates a system configuration of the vehicle 20. The vehicle 20 includes a sensor 29, the assistance apparatus 40, a communication apparatus 250, and an alert apparatus 270.

The sensor 29 includes a yaw rate sensor 24, a GNSS receiver 25, a vehicle speed sensor 26, and the like. The vehicle speed sensor 26 is configured to detect a vehicle speed of the vehicle 20. The yaw rate sensor 24 is configured to detect a yaw rate of the vehicle 20. The GNSS receiver 25 is configured to acquire information of a current position of the vehicle 20. The alert apparatus 270 is equipment including, for example, a human machine interface (HMI) function. The communication apparatus 250 is responsible for communication with the outside of the vehicle 20. The communication apparatus 250 is configured to perform vehicle-to-vehicle communication by direct communication such as, for example, PC5. The communication apparatus 250 includes a reception unit 251 and a transmission unit 252.

The assistance apparatus 40 includes a processing unit 200 and a storage unit 290. The processing unit 200 is realized by an arithmetic processing apparatus including a processor, for example. The storage unit 290 is realized by including a nonvolatile storage medium. The processing unit 200 performs processing by using information stored in the storage unit 290. The processing unit 200 may be realized by an electronic control unit (ECU) including a microcomputer equipped with a CPU, a ROM, a RAM, an 1/O, a bus, and the like.

The processing unit 200 includes a calculation unit 210, a range change unit 220, a detection unit 230, and an assistance control unit 240.

The reception unit 251 is configured to receive information indicating a travelling hazardous point which is transmitted from the outside of the vehicle 20. The slip point is an example of the travelling hazardous point. The travelling hazardous point may be any point with a risk for the travelling of the vehicle in addition to the slip point.

The calculation unit 210 is configured to calculate a distance and an orientation from the vehicle 20 to the travelling hazardous point based on the travelling hazardous point and the current position of the vehicle 20. The detection unit 230 is configured to detect the travelling hazardous point inside a detection range set within a range in which the distance from the vehicle 20 is a first distance or more and a second distance or less. The first distance is a travel distance required for a speed of the vehicle 20 to be slowed down to a predetermined speed or less by the time the vehicle 20 reaches the travelling hazardous point from the current position of the vehicle 20. The assistance control unit 240 is configured to perform the travelling assistance when the travelling hazardous point is detected inside the detection range. For example, the assistance control unit 240 informs that the travelling hazardous point exists through the HMI function included in the alert apparatus 270. Note that the assistance control unit 240 may assist driving of the vehicle 20 itself. The assistance control unit 240 may assist control of the travelling speed of the vehicle 20. The assistance control unit 240 may assist steering of the vehicle 20.

The range change unit 220 may set a spread angle of the detection range from the current position of the vehicle 20 to be larger and set the second distance to be longer as the travelling speed of the vehicle 20 is faster. The range change unit 220 may change a width of the detection range depending on whether the travel path of the vehicle 20 is a straight road or a curved road. For example, in a case where the travel path of the vehicle 20 is a curved road, the range change unit 220 may set the detection range to be wider than a case where the travel path of the vehicle 20 is a straight road. In a case where the travel path of the vehicle 20 is a curved road, the range change unit 220 may set the spread angle of the detection range from the current position of the vehicle 20 to be larger than a case where the travel path of the vehicle 20 is a straight road.

When it is sensed that a point at which the vehicle 20 has travelled is hazardous for travelling, the transmission unit 252 is configured to transmit, to the outside of the vehicle 20, information indicating the point that is sensed to be hazardous for travelling as information indicating the travelling hazardous point. For example, when slipping is detected by an ABS function, the assistance apparatus 40 may sense that the point at which the vehicle 20 has travelled is hazardous for travelling. When it is sensed that the point at which the vehicle 20 has travelled is hazardous for travelling, the assistance control unit 240 may suppress the travelling assistance.

When performing the travelling assistance is performed, even when the reception unit 251 receives information indicating a new travelling hazardous point, the assistance control unit 240 may continue the travelling assistance until the vehicle 20 passes through the travelling hazardous point and may suppress the travelling assistance based on the information indicating the new travelling hazardous point.

Figure 4:
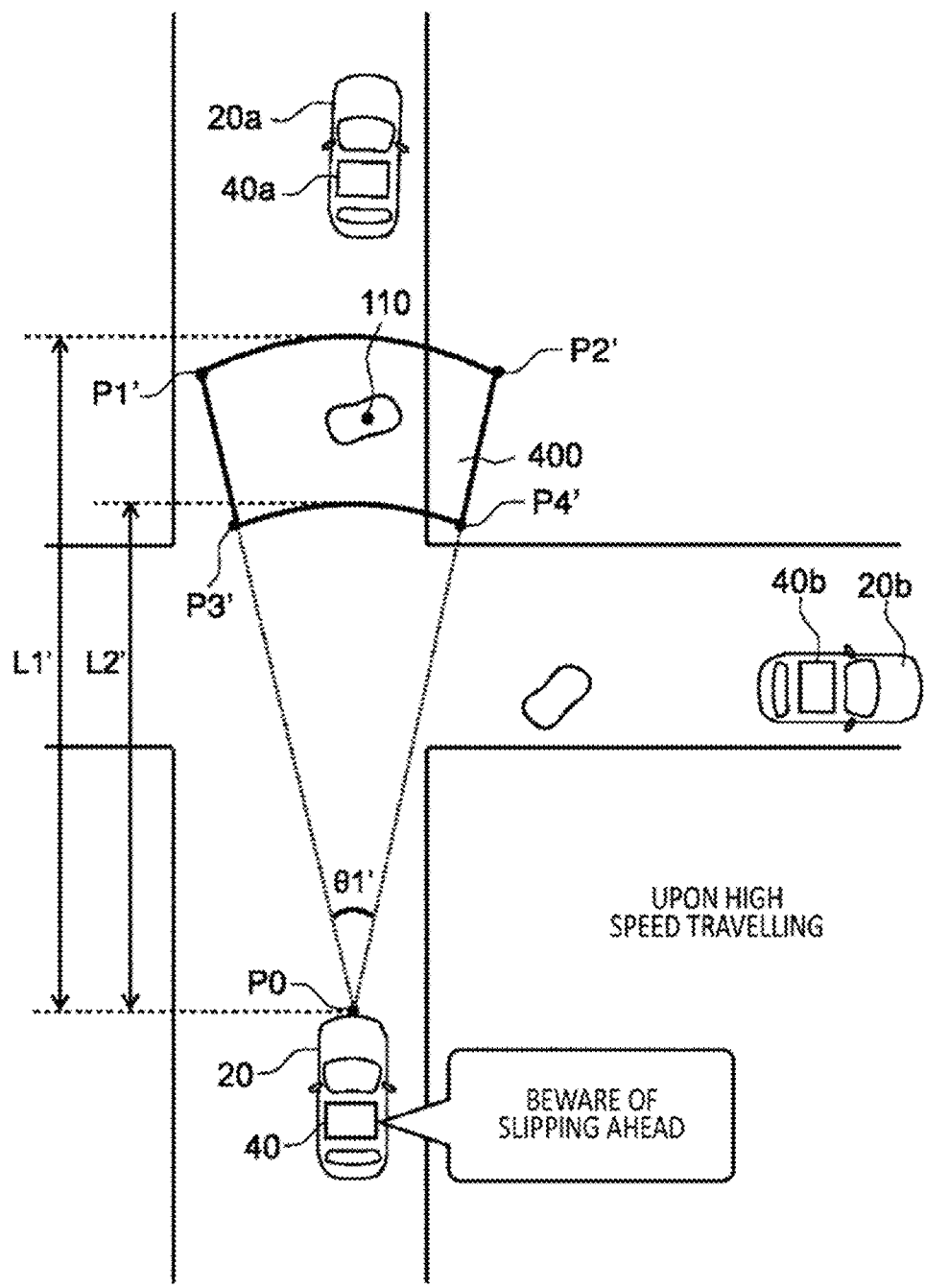
FIG. 4 illustrates a state in which a detection range 400 is changed according to a speed.

FIG. 4 illustrates a state in which a detection range 400 is changed according to a speed. The detection range 400 is a detection range in a case where the vehicle 20 is travelling on a straight road and the vehicle speed of the vehicle 20 is faster than a case illustrated in FIG. 1. Note that the range change unit 220 can determine whether the vehicle 20 is travelling on a straight road based on the speed detected by the vehicle speed sensor 26 and the yaw rate detected by the yaw rate sensor 24.

Specifically, the detection range 400 is a range obtained by excluding a fan-shaped range with a central angle θ1' which is surrounded by a straight line P0P3', an arc with a radius L2', and a straight line P0P4' from a fan-shaped range with the central angle θ1' which is surrounded by a straight line P0P1', an arc with a radius L1', and a straight line P0P2'. Herein, P3' is on a straight line P0P1', and P4' is on a straight line P0P2'. The detection range 400 is a range bilaterally symmetrical with respect to the direction of travel of the vehicle 20.

The central angle θ1' is an angle formed by straight lines defining the detection range 400 that are left and right straight lines with respect to the direction of travel of the vehicle 20. That is, the central angle θ1' represents the spread angle of the detection range 400. L1' is a distance from the current position P0 of the vehicle 20 to a farthest position of the detection range 400 from the vehicle 20. The range change unit 220 sets L1' to be longer than L1 and sets L2' to be longer than L2. In addition, the range change unit 220 sets θ1' to be smaller than θ1. As a result, as the speed of the vehicle 20 is faster, a spread of the detection range in a direction orthogonal to the travelling direction of the vehicle 20 is set to be narrower. In this manner, the range change unit 220 changes the spread angle of the detection range according to the vehicle speed of the vehicle 20.

The detection unit 230 determines whether the slip point is included in the detection range 400 based on the distance and the orientation to the slip point 110 from the vehicle 20 which are calculated by the calculation unit 210 and also based on the current position of the vehicle 20. When the slip point 110 is included inside the detection range 400, the assistance control unit 240 performs the travelling assistance.

In normal circumstances, as the speed of the vehicle 20 is faster, it is less likely that the travelling direction of the vehicle 20 suddenly changes in a crosswise direction. Thus, as the speed of the vehicle 20 is faster, the detection range in the direction orthogonal to the travelling direction of the vehicle 20 is set to be narrower, so that it is possible to suppress unnecessary output of an alert.

Similarly as in L2, when the vehicle 20 is slowed at a predetermined deceleration rate, the range change unit 220 changes L2' to a distance for the vehicle 20 to travel until the speed of the vehicle 20 is slowed down to a predetermined speed. In this manner, L2' is set according to the vehicle speed of the vehicle 20. As a result, an alert can be output only when the vehicle 20 exists within a range in which the speed of the vehicle 20 can be slowed down to the predetermined speed.

Figure 5:
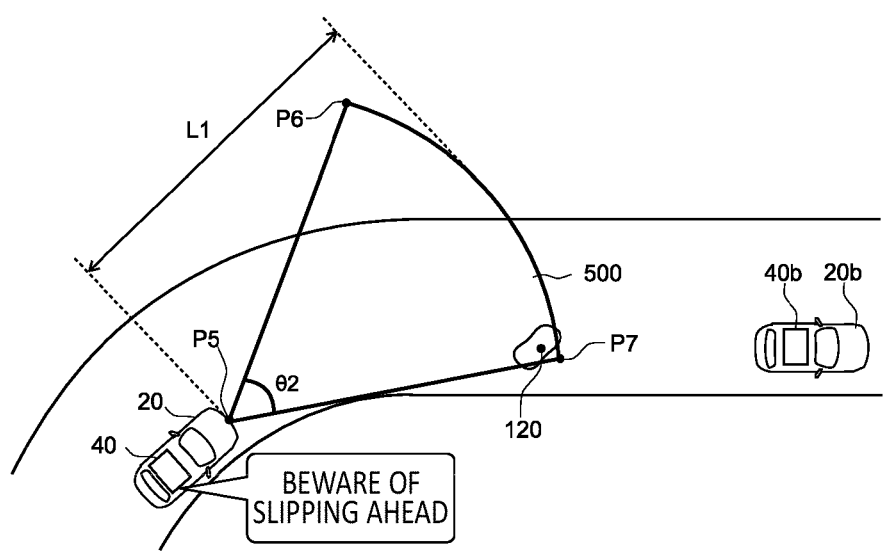
FIG. 5 illustrates a detection range 500 which is to be set when the vehicle 20 is travelling on a curved road.

FIG. 5 illustrates a detection range 500 which is to be set when the vehicle 20 is travelling on a curved road. Herein, it is assumed that when the vehicle 20 is travelling behind the vehicle 20b, the vehicle 20 receives the slip point 120 from the vehicle 20b. It is assumed that a speed of the vehicle 20 is the same as the vehicle speed of the vehicle 20 in FIG. 1.

The range change unit 220 determines whether the vehicle 20 is travelling on a curved road based on the speed detected by the vehicle speed sensor 26 and the yaw rate detected by the yaw rate sensor 24. The range change unit 220 sets the fan-shaped detection range 500 with a current position P5 of the vehicle 20 as a center. Specifically, the detection range 500 is a fan-shaped range with a central angle θ2 which is surrounded by a straight line P5P6, an arc with a radius L1, and a straight line P5P7. The range change unit 220 sets θ2 to be larger than θ1.

As a result, in a case where the vehicle 20 is travelling on a curved road, the detection range in the direction orthogonal to the travelling direction of the vehicle 20 can be set to be wider than a case where the vehicle 20 is travelling on a straight road. As a result, it is possible to avoid missing the detection of the slip point 120.

FIG. 6 illustrates a data structure of detection range data which is referred to when the range change unit 220 sets a detection range. The detection range data associates a speed and a maximum distance with a central angle in a case where the vehicle is travelling on a straight road and a central angle in a case where the vehicle is travelling on a curved road.

The speed is a speed of the vehicle 20. A maximum distance L1 is a distance from the current position of the vehicle 20 to a farthest position of the detection range. The central angle is an angle formed by left and right straight lines defining the detection range.

As illustrated in FIG. 6, as the speed is faster, the range change unit 220 sets the maximum distance L1 to be longer. As the speed is faster, the range change unit 220 sets the central angle to be narrower. In a case where the vehicle 20 is travelling on a curved road, the range change unit 220 sets the central angle to be larger than a case where the vehicle 20 is travelling on a straight road.

As a result, an alert of a slip point with a high risk for the vehicle 20 to travel among slip points detected by other vehicles can be efficiently provided to an occupant of the vehicle 20. In addition, the alert can be provided when the vehicle speed of the vehicle 20 can be sufficiently slowed down by the time the vehicle 20 reaches the slip point. As a result, it is possible to suppress provision of an unnecessary alert related to the slip point. Therefore, the occupant of the vehicle 20 can avoid feeling cumbersome towards alerts.

In the present embodiment, the slip point information is transmitted and received by the vehicle-to-vehicle communication. However, a mode may be adopted where a server configured to retain the slip point information is further included. For example, when the slip point information transmitted from each vehicle is received, the server may retain the slip point indicated by the slip point information for a predetermined period. The server may transmit information indicating the retained slip point to a vehicle travelling towards the slip point. There may be a case where a vehicle travelling in a position away from another vehicle that has detected the slip point can not receive the slip point information by the vehicle-to-vehicle communication, but with the provision of the server configured to retain the slip point information, the slip point information can be more reliably provided to the vehicle.

Note that the vehicle 20 is a vehicle as an example of transport equipment. The vehicle may be an automobile such as an automobile including an internal combustion engine, an electric vehicle, and a fuel cell vehicle (FCV). The automobile includes a bus, a truck, a two-wheeled vehicle, or the like. The vehicle may be a saddle type vehicle or the like, and may be a motorcycle. The transport equipment includes, in addition to the vehicle, equipment such as an aircraft including an unmanned aerial vehicle, and a ship. The transport equipment may be any equipment for transporting people or items. The transport equipment is an example of the movable object. The movable object is not limited to the transport equipment but may be any movable equipment.

Figure 7:
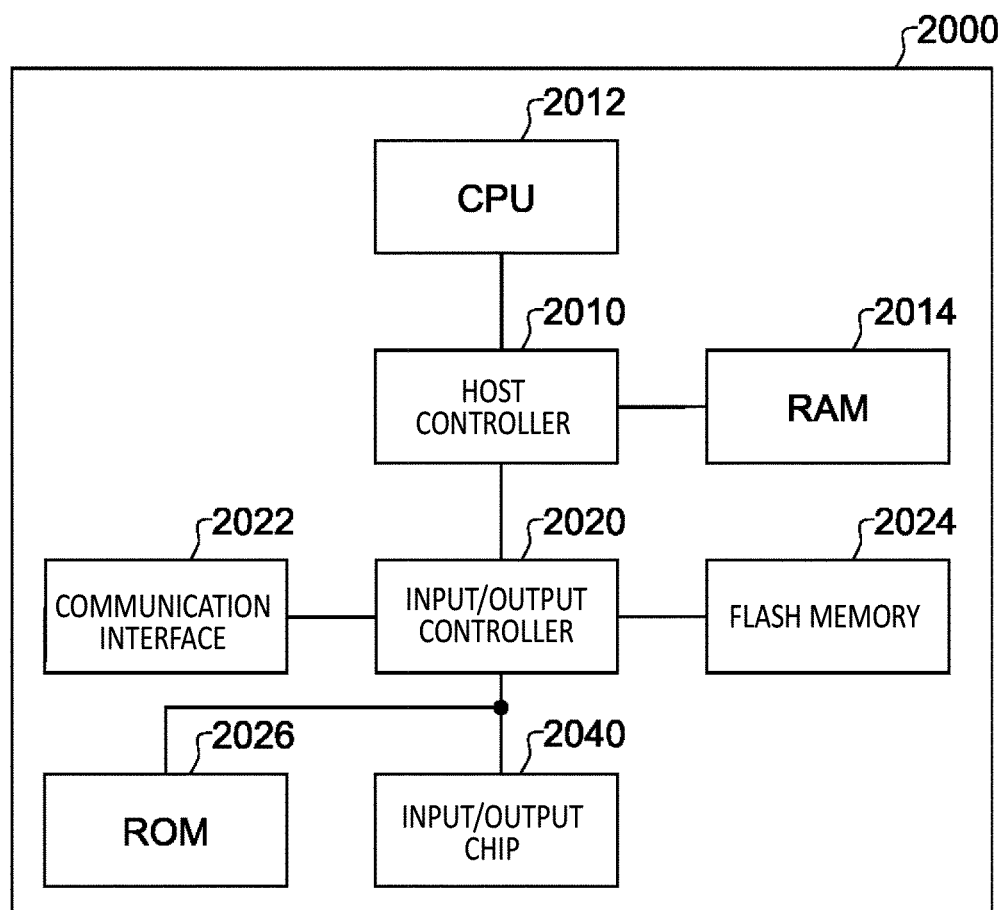
FIG. 7 illustrates an example of a computer 2000.

FIG. 7 illustrates an example of a computer 2000 in which a plurality of embodiments of the present invention may be entirely or partially embodied. Programs installed in the computer 2000 can cause the computer 2000 to: function as a system according to the embodiments or each unit of the system or an apparatus such as the assistance apparatus or each unit of the apparatus; execute operations associated with the system or each unit of the system or the apparatus or each unit of the apparatus; and/or execute a process according to the embodiments or steps of the process. Such a program may be executed by a CPU 2012 to cause the computer 2000 to perform certain operations associated with the processing procedures described herein and some of or all of the blocks in the block diagrams.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to programs stored in the ROM 2026 and the RAM 2014, thereby controlling each unit.

The communication interface 2022 communicates with other electronic devices via a network. The flash memory 2024 stores programs and data used by the CPU 2012 within the computer 2000. The ROM 2026 stores therein a boot program or the like executed by the computer 2000 at the time of activation, and/or a program depending on the hardware of the computer 2000. The input/output chip 2040 may connect various input/output units such as a keyboard, a mouse, and a monitor to the input/output controller 2020 via input/output ports such as a serial port, a parallel port, a keyboard port, a mouse port, a monitor port, a USB port, and a HDMI (registered trademark) port.

A program is provided via a network or computer readable storage media such as a CD-ROM, a DVD-ROM, or a memory card. The RAM 2014, the ROM 2026, or the flash memory 2024 is an example of the computer readable storage medium. Programs are installed in the flash memory 2024, the RAM 2014, or the ROM 2026 and executed by the CPU 2012. The information processing written in these programs is read by the computer 2000, and thereby cooperation between a program and the above-described various types of hardware resources is achieved. An apparatus or method may be constituted by carrying out the operation or processing of information by using the computer 2000.

For example, when communication is carried out between the computer 2000 and an external device, the CPU 2012 may execute a communication program loaded onto the RAM 2014 to instruct communication processing to the communication interface 2022, based on the processing written in the communication program. The communication interface 2022, under control of the CPU 2012, reads transmission data stored on transmission buffering regions provided in recording media such as the RAM 2014 and the flash memory 2024, and transmits the read transmission data to a network and writes reception data received from a network to reception buffering regions or the like provided on the recording media.

In addition, the CPU 2012 may cause all or a necessary portion of a file or a database to be read into the RAM 2014, the file or the database having been stored in a recording medium such as the flash memory 2024, etc., and perform various types of processing on the data on the RAM 2014. The CPU 2012 may then write back the processed data to the recording medium.

Various types of information, such as various types of programs, data, tables, and databases, may be stored in the recording medium to undergo information processing. The CPU 2012 may perform various types of processing on the data read from the RAM 2014, which includes various types of operations, information processing, conditional judging, conditional branch, unconditional branch, search/replace of information, etc., as described herein and designated by an instruction sequence of programs, and writes the result back to the RAM 2014. In addition, the CPU 2012 may search for information in a file, a database, etc., in the recording medium. For example, when a plurality of entries, each having an attribute value of a first attribute associated with an attribute value of a second attribute, are stored in the recording medium, the CPU 2012 may search for an entry matching the condition whose attribute value of the first attribute is designated, from among the plurality of entries, and read the attribute value of the second attribute stored in the entry, thereby acquiring the attribute value of the second attribute associated with the first attribute satisfying the predetermined condition.

The program or software module described above may be stored in a computer readable storage medium on the computer 2000 or near the computer 2000. A recording medium such as a hard disk or a RAM provided in a server system connected to a dedicated communication network or the Internet can be used as the computer readable storage media. A program stored in the computer readable storage medium may be provided to the computer 2000 via a network.

The programs installed onto the computer 2000 for causing the computer 2000 to function as the assistance apparatus 40 may instruct the CPU 2012 or the like to cause the computer 2000 to function as each unit of the assistance apparatus 40. The information processing written in these programs are read by the computer 2000 to cause the computer to function as each unit of the assistance apparatus 40, which is specific means realized by the cooperation of software and the various types of hardware resources described above. These specific means implement operations or processing of information according to the intended use of the computer 2000 in the present embodiment, and the assistance apparatus 40 is thereby constructed to be specific for the intended use.

Various embodiments have been described by referring to the block diagrams and the like. In the block diagram, each block may represent (1) a step of a process in which an operation is executed, or (2) each unit of the apparatus having a role of executing the operation. Certain steps and each unit may be implemented by dedicated circuitry, programmable circuitry supplied with computer readable instructions stored on computer readable storage media, and/or processors supplied with computer readable instructions stored on computer readable storage media. Dedicated circuitry may include digital and/or analog hardware circuits and may include integrated circuits (IC) and/or discrete circuits. Programmable circuitry may include reconfigurable hardware circuits including logical AND, logical OR, logical XOR, logical NAND, logical NOR, and other logical operations, flip-flops, registers, memory elements, etc., such as field-programmable gate arrays (FPGA), programmable logic arrays (PLA), etc.

Computer readable storage media may include any tangible device that can store instructions for execution by a suitable device, such that the computer readable storage medium having instructions stored therein forms at least a portion of an article of manufacture including instructions which can be executed to create means for performing a processing procedure or operations specified in the block diagrams. Examples of the computer readable storage medium may include an electronic storage medium, a magnetic storage medium, an optical storage medium, an electromagnetic storage medium, a semiconductor storage medium, and the like. More specific examples of the computer readable storage medium may include a floppy disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disk read only memory (CD-ROM), a digital versatile disk (DVD), a Blu-ray (registered trademark) disk, a memory stick, an integrated circuit card, or the like.

The computer readable instruction may include an assembler instruction, an instruction-set-architecture (ISA) instruction, a machine instruction, a machine dependent instruction, a microcode, a firmware instruction, state-setting data, or either of source code or object code written in any combination of one or more programming languages including an object-oriented programming language such as Smalltalk (registered trademark), JAVA (registered trademark), and C++, and a conventional procedural programming language such as a "C" programming language or a similar programming language.

Computer readable instructions may be provided to a processor of a general purpose computer, special purpose computer, or other programmable data processing apparatus, or to programmable circuitry, locally or via a local area network (LAN), wide area network (WAN) such as the Internet, etc., to execute the computer readable instructions to provide means for performing described processing procedure or operations specified in the block diagrams. Examples of the processor include a computer processor, a processing unit, a microprocessor, a digital signal processor, a controller, a microcontroller, and the like.

While the present invention has been described with the embodiments, the technical scope of the present invention is not limited to the above described embodiments. It is apparent to persons skilled in the art that various alterations and improvements can be added to the above-described embodiments. It is also apparent from the description of the claims that the embodiments to which such alterations or improvements are made can be included in the technical scope of the present invention.

The operations, procedures, steps, and stages of each process performed by an apparatus, system, program, and method shown in the claims, specification, or drawings can be performed in any order as long as the order is not indicated by "prior to," "before," or the like and as long as the output from a previous process is not used in a later process. Even if the process flow is described using phrases such as "first" or "next" in the claims, specification, or drawings, it does not necessarily mean that the process must be performed in this order.

EXPLANATION OF REFERENCES

20: vehicle;
29: sensor;
24: yaw rate sensor;
25: GNSS receiver;
26: vehicle speed sensor;
40: assistance apparatus;
200: processing unit;
210: calculation unit;
220: range change unit;
230: detection unit;
240: assistance control unit;
250: communication apparatus;
251: reception unit;
252: transmission unit;
270: alert apparatus;
290: storage unit;
2000: computer;
2010: host controller;
2012: CPU;
2014: RAM;
2020: input/output controller;
2022: communication interface;
2024: flash memory;
2026: ROM;
2040: input/output chip.

What is claimed is:

1. An assistance apparatus included in a vehicle, the assistance apparatus comprising:
a reception unit configured to receive information indicating a travelling hazardous point which is transmitted from an outside of the vehicle;
a calculation unit configured to calculate, in response to receiving the information indicating the travelling hazardous point by the reception unit, a distance and an orientation from the vehicle to the travelling hazardous point based on the travelling hazardous point and a current position of the vehicle;
a detection unit configured to determine whether the travelling hazardous point indicated by the information received by the reception unit is included inside a detection range, wherein the detection range is set, based on the distance and the orientation calculated by the calculation unit, between a first distance from the current position of the vehicle and a second distance from the current position of the vehicle, wherein the second distance is larger than the first distance; and
an assistance control unit configured to perform travelling assistance when the detection unit determines that the travelling hazardous point is included inside the detection range, wherein
the first distance is a travel distance required for a speed of the vehicle to be slowed down to a predetermined speed or less by a time the vehicle reaches the travelling hazardous point from the current position of the vehicle.

2. The assistance apparatus according to claim 1, comprising:
a range change unit configured to change a width of the detection range depending on whether a travel path of the vehicle is a straight road or a curved road.

3. The assistance apparatus according to claim 2, wherein in a case where the travel path of the vehicle is a curved road, the range change unit is configured to set the detection range to be wider than a case where the travel path of the vehicle is a straight road.

4. The assistance apparatus according to claim 3, further comprising:
a transmission unit configured to transmit, when it is sensed that a point at which the vehicle has travelled is hazardous for travelling, information indicating the point that is sensed to be hazardous for travelling as information indicating a travelling hazardous point to an outside of the vehicle, wherein
the assistance control unit is configured to suppress the travelling assistance when it is sensed that a point at which the vehicle is travelling is hazardous for travelling.

5. The assistance apparatus according to claim 2, wherein in a case where the travel path of the vehicle is a curved road, the range change unit is configured to set a spread angle of the detection range from the current position of the vehicle to be larger than a case where the travel path of the vehicle is a straight road.

6. The assistance apparatus according to claim 5, further comprising:
a transmission unit configured to transmit, when it is sensed that a point at which the vehicle has travelled is hazardous for travelling, information indicating the point that is sensed to be hazardous for travelling as information indicating a travelling hazardous point to an outside of the vehicle, wherein the assistance control unit is configured to suppress the travelling assistance when it is sensed that a point at which the vehicle is travelling is hazardous for travelling.

7. The assistance apparatus according to claim 2, further comprising:

a transmission unit configured to transmit, when it is sensed that a point at which the vehicle has travelled is hazardous for travelling, information indicating the point that is sensed to be hazardous for travelling as information indicating a travelling hazardous point to an outside of the vehicle, wherein the assistance control unit is configured to suppress the travelling assistance when it is sensed that a point at which the vehicle is travelling is hazardous for travelling.

8. The assistance apparatus according to claim 2, wherein when performing the travelling assistance, even when the reception unit receives information indicating a new travelling hazardous point, the assistance control unit is configured to continue the travelling assistance until the vehicle passes through the travelling hazardous point and to suppress travelling assistance based on the information indicating the new travelling hazardous point.

9. The assistance apparatus according to claim 1, further comprising:

a transmission unit configured to transmit, when it is sensed that a point at which the vehicle has travelled is hazardous for travelling, information indicating the point that is sensed to be hazardous for travelling as information indicating a travelling hazardous point to an outside of the vehicle, wherein the assistance control unit is configured to suppress the travelling assistance when it is sensed that a point at which the vehicle is travelling is hazardous for travelling.

10. The assistance apparatus according to claim 1, wherein when performing the travelling assistance, even when the reception unit receives information indicating a new travelling hazardous point, the assistance control unit is configured to continue the travelling assistance until the vehicle passes through the travelling hazardous point and to suppress travelling assistance based on the information indicating the new travelling hazardous point.

11. The assistance apparatus according to claim 1, wherein the reception unit is configured to receive the information indicating the travelling hazardous point transmitted from one or more other vehicles via a vehicle-to-vehicle communication.

12. An assistance apparatus comprising:

a reception unit configured to receive information indicating a travelling hazardous point which is transmitted from an outside of a vehicle;

a calculation unit configured to calculate a distance and an orientation from the vehicle to the travelling hazardous point based on the travelling hazardous point and a current position of the vehicle;

a detection unit configured to detect the travelling hazardous point inside a detection range set within a range in which a distance from the vehicle is a first distance or more and a second distance or less;

an assistance control unit configured to perform travelling assistance when the travelling hazardous point is detected inside the detection range; and a range change unit configured to set a spread angle of the detection range from the current position of the vehicle to be larger and set the second distance to be longer as a travelling speed of the vehicle is faster, wherein the first distance is a travel distance required for a speed of the vehicle to be slowed down to a predetermined speed or less by a time the vehicle reaches the travelling hazardous point from the current position of the vehicle.

13. The assistance apparatus according to claim 12, comprising:

a range change unit configured to change a width of the detection range depending on whether a travel path of the vehicle is a straight road or a curved road.

14. The assistance apparatus according to claim 13, wherein in a case where the travel path of the vehicle is a curved road, the range change unit is configured to set the detection range to be wider than a case where the travel path of the vehicle is a straight road.

15. The assistance apparatus according to claim 14, wherein in a case where the travel path of the vehicle is a curved road, the range change unit is configured to set a spread angle of the detection range from the current position of the vehicle to be larger than a case where the travel path of the vehicle is a straight road.

16. The assistance apparatus according to claim 13, wherein in a case where the travel path of the vehicle is a curved road, the range change unit is configured to set a spread angle of the detection range from the current position of the vehicle to be larger than a case where the travel path of the vehicle is a straight road.

17. The assistance apparatus according to claim 12, further comprising:

a transmission unit configured to transmit, when it is sensed that a point at which the vehicle has travelled is hazardous for travelling, information indicating the point that is sensed to be hazardous for travelling as information indicating a travelling hazardous point to an outside of the vehicle, wherein the assistance control unit is configured to suppress the travelling assistance when it is sensed that a point at which the vehicle is travelling is hazardous for travelling.

18. The assistance apparatus according to claim 12, wherein when performing the travelling assistance, even when the reception unit receives information indicating a new travelling hazardous point, the assistance control unit is configured to continue the travelling assistance until the vehicle passes through the travelling hazardous point and to suppress travelling assistance based on the information indicating the new travelling hazardous point.

19. A vehicle comprising an assistance apparatus including:

a reception unit configured to receive information indicating a travelling hazardous point which is transmitted from an outside of the vehicle;

a calculation unit configured to calculate, in response to receiving the information indicating the travelling hazardous point by the reception unit, a distance and an orientation from the vehicle to the travelling hazardous point based on the travelling hazardous point and a current position of the vehicle;

a detection unit configured to determine whether the travelling hazardous point indicated by the information received by the reception unit is included inside a detection range, wherein the detection range is set, based on the distance and the orientation calculated by the calculation unit, between a first distance from the current position of the vehicle and a second distance from the current position of the vehicle, wherein the second distance is larger than the first distance; and an assistance control unit configured to perform travelling assistance when the detection unit determines that the travelling hazardous point is included inside the detection range, wherein the first distance is a travel distance required for a speed of the vehicle to be slowed down to a predetermined speed or less by a time the vehicle reaches the travelling hazardous point from the current position of the vehicle.

20. A non-transitory computer readable storage medium having stored thereon a program, the program causing a computer to function as:

a reception unit configured to receive information indicating a travelling hazardous point which is transmitted from an outside of a vehicle;

a calculation unit configured to calculate, in response to receiving the information indicating the travelling hazardous point by the reception unit, a distance and an orientation from the vehicle to the travelling hazardous point based on the travelling hazardous point and a current position of the vehicle;

a detection unit configured to determine whether the travelling hazardous point indicated by the information received by the reception unit is included inside a detection range, wherein the detection range is set, based on the distance and the orientation calculated by the calculation unit, between a first distance from the current position of the vehicle and a second distance from the current position of the vehicle, wherein the second distance is larger than the first distance; and an assistance control unit configured to perform travelling assistance when the detection unit determines that the travelling hazardous point is included inside the detection range, wherein the first distance is a travel distance required for a speed of the vehicle to be slowed down to a predetermined speed or less by a time the vehicle reaches the travelling hazardous point from the current position of the vehicle.

21. An assistance method comprising:

receiving information indicating a travelling hazardous point which is transmitted from an outside of a vehicle;

calculating, in response to receiving the information indicating the travelling hazardous point, a distance and an orientation from the vehicle to the travelling hazardous point based on the travelling hazardous point and a current position of the vehicle;

determining whether the travelling hazardous point indicated by the received information is included inside a detection range, wherein the detection range is set, based on the calculated distance and the calculated orientation, between a first distance from the current position of the vehicle and a second distance from the current position of the vehicle, wherein the second distance is larger than the first distance; and performing travelling assistance when the travelling hazardous point is determined to be included inside the detection range, wherein the first distance is a travel distance required for a speed of the vehicle to be slowed down to a predetermined speed or less by a time the vehicle reaches the travelling hazardous point from the current position of the vehicle.

\* \* \* \* \*